(No Model.)

H. C. RICE.
FILTER.

No. 257,516. Patented May 9, 1882.

Attest:
Charles Pickles
Geo. H. Knight

Inventor:
Henry C. Rice
By Knight Bros
Attys.

UNITED STATES PATENT OFFICE.

HENRY C. RICE, OF LOUISIANA, MISSOURI.

FILTER.

SPECIFICATION forming part of Letters Patent No. 257,516, dated May 9, 1882.

Application filed October 25, 1881. (No model.)

*To all whom it may concern:*

Be it known that I, HENRY C. RICE, of Louisiana, in the county of Pike and State of Missouri, have invented a certain new and useful Improvement in Filters, of which the following is a full, clear, and exact description, reference being had to the accompanying drawings, forming part of this specification.

My invention consists in forming a filter of two cylinders or tubes of frusto-conical shape and a sheet of filtering material, the inner tube being perforated and of less diameter than the outer one and forming the lower half of the receptacle for the liquid to be filtered, and the outer tube forming the upper half of the receptacle and adapted to support the lower or inner one, which is inserted by pressing it with the filtering material through the outer tube to project it sufficiently to expose the perforated portion, as hereinafter described.

Figure 1:
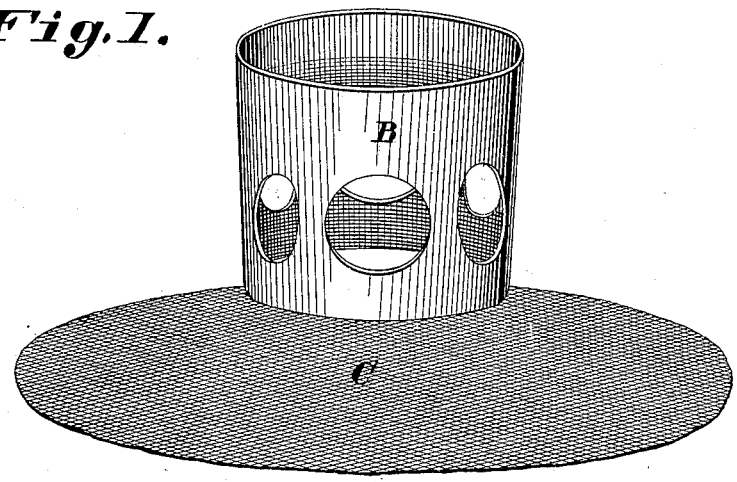
Figure 2:
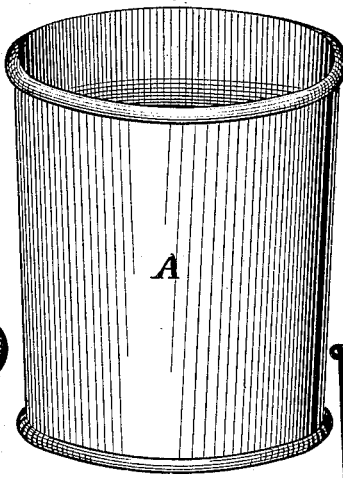
Figure 3:
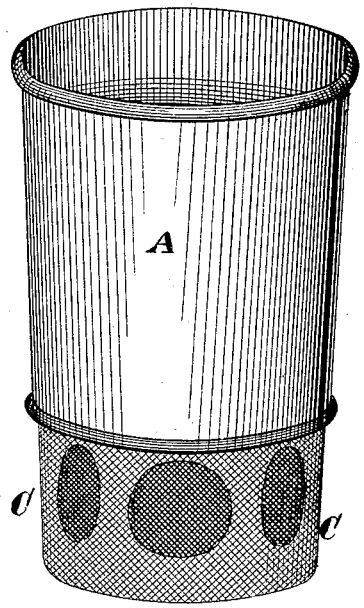
Figure 3:
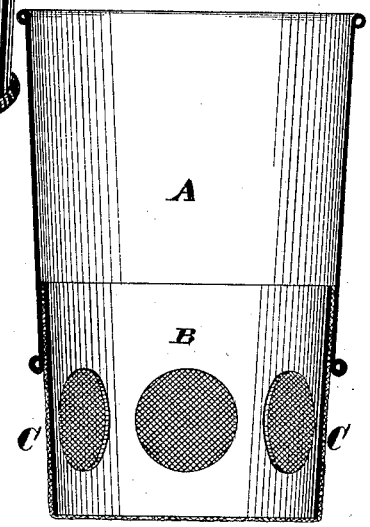

In the drawings, Figure 1 is a perspective view of the parts before being put together. Fig. 2 is a perspective view with the parts put together, and Fig. 3 is a sectional view of same.

A represents the outer and larger frusto-conical cylinder, open at both ends, and suspended in any suitable way in or above a vessel to receive the filtered liquid.

B is the inner and smaller frusto-conical cylinder, having its lower end perforated, either as shown or with a greater number of smaller perforations. This cylinder is preferably open at both ends, but it may have a bottom, which would preferably be perforated. This latter cylinder slides within the other.

C is a piece of filtering-cloth, a fibrous material preferably being used, although fine wire would answer the purpose, which incloses the lower portion of the inner cylinder, and is held in place by the contact of the two members when in position.

Although I have described and do prefer the two members A and B as being of cylindrical shape, yet I do not confine myself to this special shape, as any shape would answer, the shape of one of course corresponding with that of the other.

A practical advantage of my mode of securing the filtering-cloth in place over those heretofore constructed is that any strain brought upon the cloth tends to tighten its hold. To put the parts together, the cloth is placed over the top of the outer tube, A, and the inner tube, B, is then inserted, small end first, into the member A, carrying the cloth down with it into the position shown in Figs. 2 and 3, where it is retained, as described.

Having thus described my invention, the following is what I claim as new therein and desire to secure by Letters Patent:

1. The filter herein described, consisting of outer upper tube, A, inner lower tube, B, and filtering material C, the outer tube forming the upper half of the receptacle and supporting the filter and the inner tube forming the lower half of the receptacle and projecting beneath the outer tube, as shown and described.

2. The filter consisting of inner and outer frusto-conical tubes, A and B, and filtering material C, the inner tube being pressed into the outer tube to hold the cloth between the two tubes and the outer tube forming the support to the filter, as set forth.

HENRY C. RICE.

Witnesses:
SAML. KNIGHT,
GEO. H. KNIGHT.